May 7, 1968     H. T. STIRLING     3,381,948
APPARATUS FOR THE RECLAMATION OF FINE MATERIAL
Original Filed Feb. 11, 1965
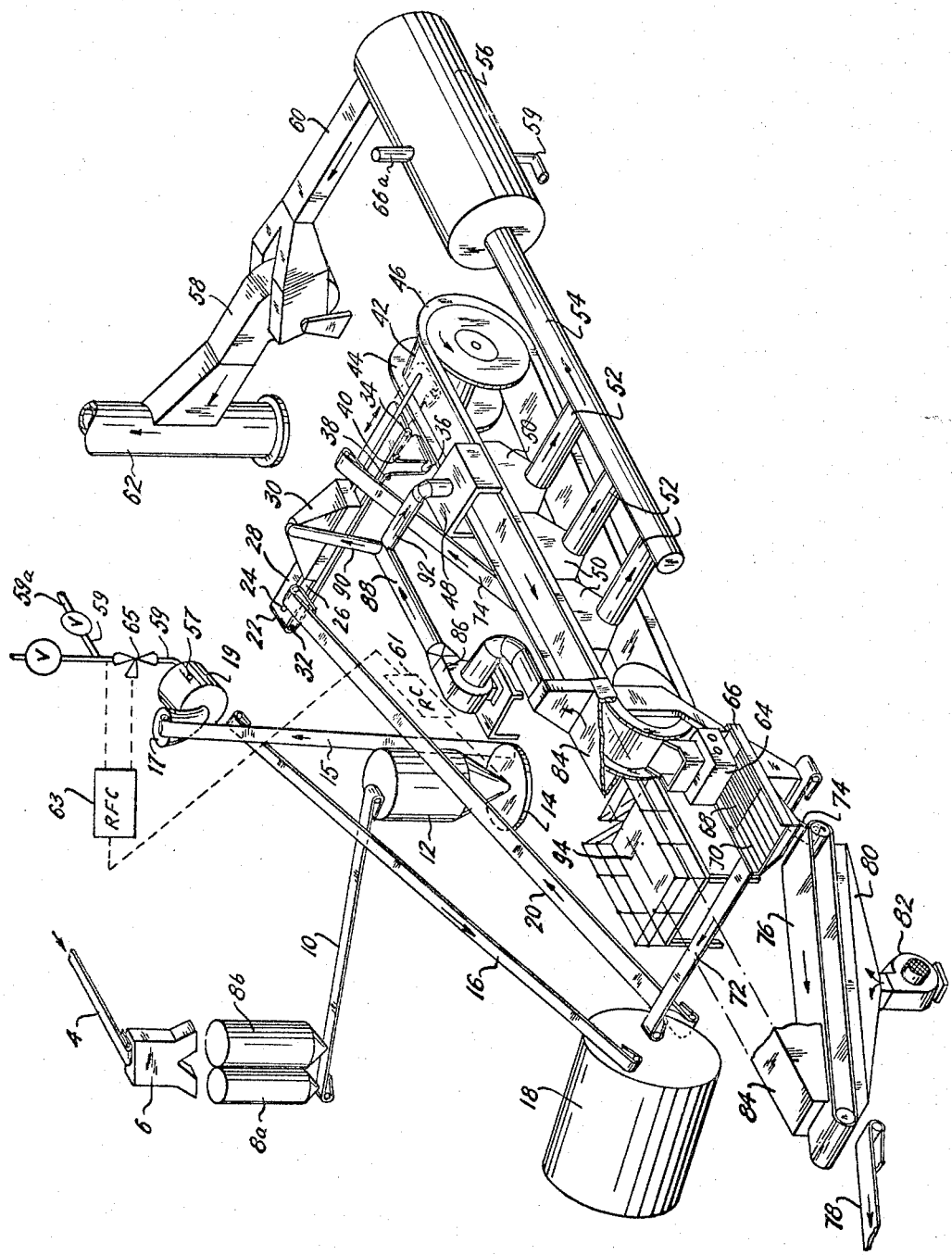
INVENTOR.
Harold T. Stirling
BY
Ronald S. Cornell
ATTORNEY

United States Patent Office 3,381,948
Patented May 7, 1968

3,381,948
APPARATUS FOR THE RECLAMATION OF FINE MATERIAL
Harold T. Stirling, Pittsburgh, Pa., assignor to Stirling Sintering Company, Pittsburgh, Pa., a corporation of Pennsylvania
Original application Feb. 11, 1965, Ser. No. 431,847, now Patent No. 3,326,669, dated June 20, 1967. Divided and this application Oct. 18, 1965, Ser. No. 509,669
8 Claims. (Cl. 266—21)

ABSTRACT OF THE DISCLOSURE

Apparatus for the reclamation of waste material by sintering or heat hardening pellets including a pelletizer for pelletizing fine particles, a sinter strand on which the pellets are heated, a single means for feeding hearth layer and a layer of pellets to the sinter strand, means for crushing the hot material formed on the sinter strand, and means for recycling hot fines from the crushing station directly to the pelletizer. The apparatus further includes upgrading means such as a magnetic separator and hood means over the discharge end of the sinter strand, and the means for crushing sinter.

---

This application is a division of my copending application Ser. No. 431,847 now Patent No. 3,326,669 which is a continuation-in-part of my application Ser. No. 243,376 filed Dec. 10, 1962, now abandoned, copending therewith.

This invention relates to the reclamation of waste material and more specifically to the production of valuable material by sintering or heat hardening pellets derived from such fines as fly ash or the dust obtained from the precipitators or dust collectors of any ferrous or non-ferrous metallurgical process.

During many industrial processes a substantial amount of fine material is obtained in the form of a fine dust-like material. Heretofore it has not been possible to utilize these fines and accordingly, since they could not be disposed of, the fines were stockpiled. In this country alone, it is conservatively estimated that there are millions of tons of such fine waste material which have been stockpiled in the past and these deposits are rapidly increasing. The cost of maintaining such stockpiles has been a long standing problem in industry and most of this material would be willingly given away at no cost merely to reduce the size and cost of the stockpiles. However, there has been no method heretofore which could reclaim this material and therefore industry could not dispose of it.

It has now been found that these costly, troublesome by-products can be converted into valuable and useful products. It is possible to convert into useful products such fine waste materials as ferro-manganese blast furnace flue dust, basic oxygen furnace dust, red-dog, phosphate rock fines, bauxite, chrome ore fines, iron ore fines, iron concentrate, certain ceramic fines, copper fines, high chrome and nickel fines, stainless steel grindings, iron sulfate, glass grinding fines, coal refuse, shale, clay, slag particles, fly ash, the iron concentrate from fly ash, the non-magnetic (tailings) fraction of fly ash, and many other waste materials which at this time are being stockpiled at great cost to industry in the United States.

Waste materials such as those disclosed above contain valuable ingredients. For example, the dust from a ferro-manganese blast furnace may contain as much as 11 percent iron and 40 percent manganese in addition to other valuable ingredients. This dust would be as valuable as the ore which is used in a ferro-manganese blast furnace if it could be used as a substitute for such ore. The problem in utilizing this material, however, is its extremely small particle size which makes it almost impossible to use the dust in the ferro-manganese blast furnace without first up-grading it.

It is well known that fine powdery material is unsuitable for treatment in blast furnaces, open hearth furnaces, basic oxygen furnaces, and the like used in the iron and steel industry. Many methods have been tried, some with limited success, for agglomeration of fine particles in such a manner as to make them suitable for blast furnaces or other industrial equipment. Briquetting presses and extrusion pelletizers require binders which are expensive. Pellets of ore concentrate have been heat treated in shaft type kilns but this type of operation is not dependable because of difficulties in obtaining uniform charging and discharging and uniform movement of material and gases through the inaccessible interior of the shaft. These difficulties in shaft kiln operation lead to non-uniform burning, hanging of the charge and sintering together of pellets in parts of the kiln so as to hinder gas flow and promote additional irregularities, such as dense overburned chunks of material in one part of the charge, underburned pellets in other parts of the charge, and a general lack of uniformity in the product. It has been attempted heretofore to sinter these fine powdery materials but such attempts have heretofore been rather fruitless.

For blast furnace use the ore should have a relatively large particle size. Thus particles of $\frac{1}{8}$ inch to 1 inch or even larger are necessary so as to be capable of packing loosely to allow the furnace blast to pass upwardly therethrough during the smelting operation.

It has been extremely difficult heretofore to agglomerate the hereinabove described fine materials so as to obtain agglomerates of a size such as to enable its use in ordinary processing equipment. It has now been discovered that by use of the particular process and apparatus of this invention these waste materials can be readily converted into usable products. By use of the novel process and apparatus of this invention, it is now possible to convert waste materials into useful products which can be profitably sold at a price far below that of the equivalent raw materials. In this manner great commercial advantages will be obtained by both the processor of the waste materials and by the user of the product produced by such processor.

In accordance with the invention, the waste material may be fed from a stockpile, storage bin, or the like to a suitable device wherein the feed material is treated to remove any undesirable portion thereof. For example, if the feed is a material containing a portion of particles having a high iron content and a second portion having a low iron content, the treating device may be a magnetic separator. Similarly, if the feed is a material having particles of varying size and composition, the treating device may be a screening means to remove a size fraction having an undesirable composition. In another embodiment of my invention, the treating device may be a leaching tank wherein undesirable impurities are removed from the feed particles.

In a preferred embodiment of my invention, fly ash, which has both a magnetic and a non-magnetic portion, is pretreated to separate the magnetic portion thereof from the non-magnetic portion or tailings. This can advantageously be accomplished by passing fly ash particles through a magnetic separator and storing the magnetic and non-magnetic portions separately. In this way, it is possible to treat either of the fly ash fractions as desired by feeding the desired fraction from its storage bin to the processing equipment. In some instances it may be necessary to pass the fly ash two or more times through the magnetic separator to recover a high grade magnetic concentrate.

Treated material is transferred from the treating device to a plurality of storage bins for the different fractions of the original feed material. In some instances, one or more bins discharges its fraction as waste. In other cases, however, such as when fly ash is separated into magnetic and non-magnetic fractions, both portions may be further treated to form valuable products.

Material from a storage bin is charged onto a suitable feeder such as a table feeder or a proportionating weigh belt type feeder. The feeder meters the flow of feed material to conform to the required amount. A suitable recording computer is operatively associated with the feeder to record the quantity of feed material delivered.

From the feeder, the material is fed to a wetting drum where the particles are moistened to a predetermined moisture content. The amount of water added in the wetting drum is automatically controlled by a flow controller, known per se, which is responsive to a signal from the feed recorder. The use of a wetting drum increases the capacity of the plant in a manner described more fully hereinafter.

The wetted material is passed from the wetting drum to a pelletizing drum wherein the fines are transformed into agglomerates. The agglomerates are heated by passage through a heated hood, and then the feed conveyor deposits the pellets evenly on a sinter strand. The pellets on the sinter strand are subjected to intense heat in an ignition furnace, and the sintering operation is completed by drawing air through the sinter strand. The hot gases, after passage through the material being sintered and the strand itself, are passed through a dust collector to discharge.

The dust collector preferably operates on the principle of passing the gas to be cleaned through one or more cascading streams of water. The water from the dust collector is recycled to the wetting drum whereby the wet dust particles from the dust collector are formed with the initial feed material into pellets. This step accomplishes two results, namely the elimination of dust, and the recovery of the valuable contents present in the dust.

The sinter formed on the sinter strand is processed in a sizing roll crusher and deposited upon a vibrating hot screen or its equivalent and then cooled on suitable apparatus such as a wire mesh conveyor belt. The roll crusher or equivalent apparatus is preferably of an adjustable type which can be set at the desired maximum size for crushing the sinter cake before screening.

The vibrating hot screen advantageously contains two sections, a small screen section having a screen size equivalent to a predetermined bottom side which section may be for example one eighth or one quarter of an inch, and a large screen section for hearth layer which may have for example a screen size of about three-eighths inch. The large screen may be omitted if no hearth layer is to be used. The hot fines which pass through the small screen section on the hot screen are returned on a special silicone impregnated wire mesh belt to the drum pelletizer whereupon these hot fines are subjected to a few additional revolutions in the pelletizer. By passing the fines to the pelletizer before they are cooled, special screens are eliminated, the amount of dust is lowered, and heat requirements are minimized. The recycling of hot fines to the pelletizer results in an increase in the sinter production of from 10–20 percent.

The material which passes through the large screen section and is retained on the small screen section of the vibrating hot screen is returned, for use as hearth layer on the sinter strand, by means of a special hearth layer belt made of silicon impregnated wire mesh. It is also possible to provide the hot screen with only the desired bottom size openings. In this event, the product with the hearth layer would discharge together into a hearth layer surge hopper where the overflow would go to product.

The plus three-eighths inch material from the vibrating screen is removed as product by means of a wire cloth cooler-conveyor belt. A hood is provided over the discharge end of the sinter strand, the sinter breaker, and the cooler-conveyor belt, and a suction is created in this hood by suitable means such as an exhaust fan. The fan forces cool air to flow up through the hot sinter product thus cooling the sinter. In addition, any dust from this area of the plant will be carried upwardly through the hood. The stream of hot, dust laden air is divided into at least two portions, one of which is passed to the heated hood of the feed conveyor, and the other to the ignition furnace. It may be desirable to use a third portion of the air to dry the pellets as they are formed in a manner discussed more fully in my copending application Ser. No. 274,251 filed Apr. 19, 1963, now Patent No. 3,210,772.

Sometimes it may be necessary to use an independent blower for the ignition furnace in order to get better control of the ignition. Accordingly, two fans are necessary with some processes where it is important to control the ignition within precise limits. In this event, one fan would be used for ignition air and the other for the predry belts. Both fans would draw the hot dirty air from the cooler and discharge end. In this manner the heat from the discharge end of the sintering machine and the cooler are utilized for preheating the ignition air and for drying and preheating the raw mix. In addition, the hearth layer and returns to the pelletizer are not substantially cooled but are used directly whereby additional heat savings are obtained.

A control platform is arranged at a position at which the discharge end of the sinter strand as well as the discharge end of the pelletizing drum can be readily observed. With the control platform at this location, it is possible to observe all of the vital points of operation from one position thereby enabling better control of the entire operation.

The feeder conveyor is of novel reciprocating design formed from a wire mesh belt and preferably divided longitudinally into two sections. A first section is adapted to receive the hearth layer and a second downstream section receives the pelletized feed material. It is, of course, possible to use an undivided conveyor solely for the pelletized feed materials in which instance a hearth layer, if one is desired, can be fed by a hopper, or the like device, directly to the sinter strand.

The feeder conveyor is arranged in a direction normal to the direction of movement of the sinter strand and feeds across the width of the travelling pallets on the sinter strand. The feeder conveyor is provided with a shuttle, head-end pulley which moves out at a speed equal to or slightly greater than the forward speed of the conveyor whereby the conveyor will be extended across the width of the sinter strand. It is then retracted in a continuous manner so that the material on the conveyor will be fed onto the sinter strand across the width thereof. The hearth layer is placed on the sinter strand upstream of the material to be sintered and the material to be sintered is thereby deposited on top of the hearth layer.

The invention is illustrated with reference to the drawing which is an isometric view showing the apparatus of the invention.

In the illustrated embodiment of the invention, fine material such as the fly ash obtained from the precipitator of a steam generating plant is delivered from a source, not shown, by means of conveyor 4 to a treating means 6 which in the case of fly ash will advantageously be a magnetic separator. The fly ash is separated in means 6 into a magnetic fraction and a non-magnetic fraction, and these fractions are discharged into storage bins 8a and 8b.

A fraction of the fly ash is selectively deposited from bin 8a or b onto moving belt 10 which charges the material into feeder bin 12 of a suitable metering type feeder 14. A commercially available type of control means such as electric or pneumatic recorder controller 61 is provided to continuously record the quantity of material that is transferred by feeder means 14 to conveyor belt 15.

Conveyor 15 charges the dry, particulate feed material to a chute 17 which transports the feed to wetting drum 19. Water is added to wetting drum 19 through nozzle 57 of conduit 59. The amount of water added is controlled by means of rate of flow controller 63 which actuates valve 65 in conduit 59 in response to signals from recorder controller 61 to compensate for variations in the amount of feed material discharged onto conveyor 15. Advantageously, the recorder controller 61 or rate of flow controller 63 will be provided with a delay circuit to compensate for the length of time required for feed to traverse the distance between recorder controller 61 and the wetting drum 19.

The finely divided particles are moistened in wetting drum 19 to the proper predetermined moisture content for the particular feed material. This may vary between about 5 and 22 percent by weight. The wetting drum not only moistens the particles, but it also forms seed particles upon which the pelletizer can build pellets at a higher rate of speed. The prewetting also reduces dust pollution which previously has been a serious problem when charging finely divided material into a pelletizer.

Prewet material is conducted by conveyor 16 from wetting drum 19 to pelletizer 18 wherein the finely divided prewet material is transformed into agglomerates.

The agglomerates formed in pelletizer 18 are conveyed by belt conveyor 20 to feed conveyor 22. Feed conveyor 22 is advantageously divided longitudinally by means of plate 24 into two sections 26 and 28. The agglomerates are fed onto longitudinal section 26 of feed conveyor 22. These agglomerates are passed under a hood 30 at which point the agglomerates are subjected to hot gases at a temperature between about 200° F. and 1000° F. A windbox (not shown) is provided under the belt 22 to provide suction to draw hot gases through the belt from hood 30.

Feed belt 22 is a shuttle belt supported by rollers 32, 34. Roller 34 is operatively connected to a shuttle, head-end pulley, not shown, whereby upon actuation of the shuttle, head-end pulley, the conveyor 22 is extended across the width of the sinter strand and then retracted to the position shown. Shuttle, head-end pulley advances roller 34 at a speed equal to or slightly greater than the forward speed of the upper strand of the conveyor. In this manner the material on the belt is not discharged on the forward thrust of the roller 34. Instead, the material on belt 22 is deposited on the sinter grate 42 upon retraction of the roller 34. This action is repeated in a continuous manner.

Roller 36, in conjunction with rollers 38, 40, is provided to take up the slack in feed conveyor 22 when the feed conveyor is in a retracted position. Since the feed conveyor 22 has its delivery end moving back and forth in a straight line transversely in respect to the sinter grate 42, the agglomerates of fine material are uniformly fed by the shuttle feed belt 22 and deposited in line back and forth across the sinter grate 42 as the latter moves. It will be understood that the back and forth motion of the delivery end of the shuttle feeder belt 22 is relatively more rapid than the rate of movement of the sinter grate 42 and the pattern of deposition has the effect of building up a level layer of uniform height directly under the shuttle belt 22 on the sinter grate 42. The agglomerates of finely divided material are thus fed uniformly onto the sinter grate 42. The sinter grate 42 is provided with side elements 44, 46 which retain the material on the belt.

The agglomerates on the belt are fed under ignition furnace 48 whereat the agglomerates are subjected to intense heat of between about 1850° and 2800° F. If the temperature is not maintained in this range, the pellets may not be properly sintered. Generally, a temperature of about 2500° F. is preferred for most materials.

Air is drawn downward through the layer of agglomerates, hearth layer, and the sinter grate 42 through wind boxes 50, duct work 52, 54 and dust collector 56 by means of a waste heat fan 58 operatively attached to the dust collector 56 by means of duct work 60. The intense heat formed in the ignition furnace 48 in conjunction with the air being passed through the sinter layer causes sintering or heat hardening of the agglomerates on the sinter strand 42. The resulting hot air passed through the wind boxes 50, duct work 52, 54, and the dust collector 56 is, by means of the waste heat fan 58, discharged through waste gas chimney 62.

When the agglomerated material has a high solid fuel content, the pellets which are formed will sinter together into a fused cake and then this sinter cake will be sized by crushing and screening as shown on the drawing. However, when the pelletized material does not contain the requisite amount of solid fuel (i.e. carbon), it will not ordinarily become fused together. Heating without the pellets becoming fused together is known as heat hardening. Heat hardened pellets do not lose their identity but remain individual spheres.

The sinter is removed from the end of sinter strand 42 and crushed in a sizing roll crusher 64 or its equivalent. The sizing roll crusher 64 is adjustable and can be set at the desired maximum size for processing the sinter cake before screening. The crushed sinter is then deposited upon a vibrating screen 66 which is comprised of two sections 68, 70.

Section 68 of hot vibrating screen 66 is a quarter inch screen (other desired bottom size screens can be used) through which pass any fines which are present. The fines passing through this quarter inch section 68 of screen 66 are recycled by suitable means, such as conveyer belt 72, to the pelletizer 18 for additional processing in the pelletizer. Section 70 of hot vibrating screen 66 is a ⅜ inch screen (or other size as desired for hearth layer) through which the plus ¼ inch-minus ⅜ inch material is passed. This intermediate size material is delivered to a conveyor belt 74. In some instances, the intermediate section can be eliminated and the hearth layer can be obtained from the product as it is fed onto the cooler. Conveyor belt 74 delivers the plus ¼ inch-minus ⅜ inch material to section 28 of feeder conveyor 22. This material or the material taken from the product before cooling is returned to the sinter strand 42 and is deposited as hearth layer on the sinter strand upstream of the agglomerates on section 26 of feeder conveyor 22.

The material which does not pass through either section 68 or 70 of screen 66 is plus ⅜ inch material. The plus ⅜ inch material is passed to conveyor belt 76 as product and from conveyor belt 76 is removed from the system by suitable means such as conveyor belt 78. The product on wire cloth conveyor belt 76 is cooled by a blast of cooling air passed through wind box 80 and conveyor belt 76 by means of a cooler fan 82.

A hood 84 is provided over the conveyor belt 76, the vibrating hot screen 66, and the discharge end of the sinter strand 42. An exhauster fan 86 provides suction within this hood 84. The suction created within hood 84 aids in drawing cooling air through the sinter. In addition, any dust from the crushing rolls 64 or the vibrating screen 66 will be carried upwardly through the hood. This hot, dust-laden air is then passed through duct work 88 and divided into two branches 90, 92. The hot air passing through duct work 90 is delivered to the preheater-dryer 30 and the hot air passing through duct work 92 feeds the ignition furnace 48. The duct work 88 is for convenience of illustration shown connected to hood 84 above the discharge end of strand 42; however, this connection is preferably located above crushing rolls 64. This also allows the strand 42 to return to the feed end without substantial cooling thereby diminishing the weakening effect of repetitive cooling and heating of the strand. This arrangement of recycled air provides for a good heat economy. As discussed above, a separate ignition fan could be used for better control of the ignition.

The plant is surprisingly dust-free. This is in part due to the combination of hoods used over certain parts of the plant which collect the air that might otherwise cause clouds of airborne finely divided particles. Thus, the normally dust-laden air from the discharge end of the sinter strand, the sinter breaker, and the wind boxes is circulated to the dust collector 56 in which the hot, dust-laden gases are cooled by a water spray. Fresh water is added to dust collector 56 through conduit 66a. After cooling, the gases pass through a rotating cylindrical packed ceramic member (not shown) the bottom portion of which is immersed in a water bath. The dust-laden air is broken into a large number of small streams which constantly are forced to change direction. In this manner, the dust particles are removed and the cleaned air progresses through conduit 60 and is discharged to the atmosphere through chimney 62.

The water from dust collector 56 containing collected material is advantageously circulated through conduit 59 to be used in the wetting drum 19 which is another important factor in keeping the plant dust-free. In this manner, the finely divided particles are recycled to the processing equipment thus increasing the final product yield. If necessary, makeup water can be added to conduit 59 through conduit 59a. In an alternate embodiment of my invention, the collected dust can be separated from the water and recycled to the pelletizer 18.

The entire plant is arranged so that control platform 94 can be located at both the discharge end of the sinter strand and the discharge end of the pelletizing drum so that both can be readily observed. With the control platform 94 at this location, it is possible to observe all of the vital points of operation from one position thereby enabling better control of the entire operation. By means of the location of the control platform 94, it is possible to readily operate all of the process variables such as the feed rate (control of table feeder 14); the pelletizer (the balling action can be carefully controlled to maintain optimum quality and size of pellets); windbox control (burn through can be continuously maintained on the last windbox); quality (increase or decrease or ignition temperature as required); and other variables such as dust control, fan speeds, etc.

The entire apparatus is of a semi-portable nature which enables relocation of the equipment after a stockpile of waste material has been depleted.

The operation of the apparatus of the invention is extremely flexible and versatile as illustrated by the examples described below.

EXAMPLE I

Precipitator dust from the precipitator of a ferro-manganese blast furnace was blended with downcomer dust from a ferro-manganese blast furnace. These materials had the analyses shown in Tables I and II below:

Table I.—Chemical analysis of precipitator dust

|  | Percent by weight |
|---|---|
| Iron | 7.40 |
| Phosphorus | 0.11 |
| Manganese | 15.87 |
| Sulfur | 1.64 |
| Silica | 8.59 |
| Alumina | 2.62 |
| CaO | 9.98 |
| MgO | 4.52 |
| Carbon | 6.78 |
| $Na_2O$ | 2.10 |
| $K_2O$ | 15.75 |
| $Li_2O$ | 0.15 |
| Miscellaneous | 1.16 |
| Intentionally added moisture | 23.33 |
| Total | 100.00 |

Table II.—Chemical analysis of downcomer dust

|  | Percent by weight |
|---|---|
| Iron | 9.91 |
| Phosphorus | 0.18 |
| Manganese | 37.50 |
| Sulfur | 3.20 |
| Silica | 10.36 |
| Alumina | 5.86 |
| CaO | 3.00 |
| MgO | 3.83 |
| Carbon | 19.53 |
| $Na_2O$ | 0.50 |
| $K_2O$ | 4.24 |
| $Li_2O$ | 0.04 |
| Miscellaneous | 1.85 |
| Total | 100.00 |

One thousand pounds of a blend of 50 percent precipitator dust and 50 percent downcomer dust was delivered directly to bin 8b since no pretreatment of the material was necessary, in some situations, however, it is desirable to leach unwanted salts from the ferro-manganese dust in which case a leaching tank or equivalent means would be used as means 6. The blend was continuously fed from bin 8b to feeder 14 and then by belt 15 to wetting drum 19 where a predetermined and automatically calculated amount of water was added. The wet material was transferred to pelletizer 18 wherein pellets were formed. The pellets were passed by means of conveyor belt 20 to section 26 of feed conveyor 22. These pellets were preheated to a temperature of about 400° F. and dried under hood 30 and were then deposited upon sinter strand 42.

After the initial pass hearth layer was formed and this hearth layer was returned by conveyor belt 74 and section 28 of feed belt 22 to the sinter strand 42, whereby the pellets being charged onto sinter strand 42 were deposited on top of the hearth layer. The pellets on sinter strand 42 were subjected to a temperature of about 2500° F. in ignition furnace 48. Air was drawn through the sinter strand and the pellets thereon to cause sintering of the agglomerates on the sinter strand. The air was then passed through dust collector 56 wherein the dust particles were removed. The water from the dust collector was recycled through conduit 59 to wetting drum 19. The sintered material passed from the sinter strand 42 to the sizing roll crusher 64.

Minus one-quarter inch material from the crusher 64 passed through screen 68 and was returned hot to the pelletizer at a position therein that it was subjected to only a few revolutions. The hot returns were thus combined with the material to be pelletized and then returned to the sinter strand. The plus one-quarter inch, minus three-eighth inch material was returned to section 28 of feed belt 22 to act as hearth layer on the sinter strand 42 and the plus three-eighth inch material was cooled on belt 76 and removed as product. Under ordinary circumstances, it was found that, on average, 2.5 tons per square foot of grate area of the blend material could be processed in a single day.

The above procedure produced hardened, sized sinter highly suitable for blast furnace use. The procedure described above remains generally true when using this equipment in the aforementioned process and works equally well with other fine materials such as fly ash from steam generating plants or pulverized coal. The following example illustrates the advantages of upgrading feed materials before processing. By performing the upgrading before sintering, the value of the end product is increased because of better quality, and, surprisingly, higher production will also result in many cases. Fly ash is typical of the improved product that can be obtained by work performed on the material before sintering, since, when material is finely divided, it is often quite easy to remove undesirable elements with a minimum of work or cost. If the feed material is not initially finely divided, it is sometimes advantageous, as with slag, for example, to mill the material so that it can be readily treated before sintering.

EXAMPLE II

Fly ash from a steam generating plant precipitator was processed in a manner similar to that described in Example I. The fly ash was, however, pretreated in treating device 6 to magnetically separate the feed material into two portions. The removal of high iron content material produced a better sinter product for lightweight material such as lightweight aggregate because it was lighter in weight and in color.

For the purpose of separating the magnetic and nonmagnetic fractions treating device 6 comprised a magnetic separator with a high speed drum and a slower drum. By using a series of drums in tandem and varying their speeds, products of varying quality can be obtained.

Tables III and IV below show analyses of the iron laden fraction obtained by the magnetic separation pretreatment.

*Table III.—Physical analysis of iron laden fly ash fraction*

| | |
|---|---|
| Specific gravity | 3.73 |
| Blains specific surface | 1461.0 |
| Loss on ignition (percent) | 0.3 |
| Tyler screen size mesh: | |
| +325 | 14.7 |
| −325 | 85.3 |

*Table IV.—Chemical analysis of iron laden fly ash fraction*

| | Wt. percent |
|---|---|
| $SiO_2$ | 15.37 |
| $Al_2O_3$ | 4.36 |
| $Fe_2O_3$ | 74.41 |
| $CaO$ | 1.40 |
| $MgO$ | 0.52 |
| $SO_3$ | 2.40 |
| $P_2O_5$ | 1.10 |
| $TiO_2$ | 0.12 |
| $Na_2O$ | 0.17 |
| $K_2O$ | 0.15 |
| Total | 100.00 |

If extremely high grade product is desirable, the iron laden fraction can be even further upgraded by additional magnetic treatments to an analysis of 90% or higher magnetic material and a specific gravity of about 4.0. When upgraded to this extent, the iron laden fraction is actually an iron concentrate of approximately 60% total iron.

The non-magnetic portion of the fly ash was wetted in wetting drum 19 to a moisture content of about 18% and then pelletized in pelletizer 18 with hot returns. The pelletized material was transported to conveyor 22 where it was predried and delivered to sinter strand 42. The pellets were heated under ignition furnace 48 to a temperature of about 2350° F. Air was drawn through windboxes 50 and the pellets were heat hardened. After crushing, screening, and cooling, the product pellets were found to be of high grade and useful as a lightweight aggregate.

The heavier portion of the separated material, which can be called the iron laden fraction, was separately processed by my invention into a heavier sintered product which is useful for many purposes such as blast furnace feed material, open hearth feed, basic oxygen furnace feed, etc. The iron laden fraction can, if desired, also be used in processes where fine iron powder is desired such as in washing plants, for thermowelding material, as additives to building materials, in powdered metallurgy, etc. However, the primary use for the iron laden fraction is for steel-making after it has been upgraded by my process which changes the fine iron particles into high quality sized sinter or heat hardened sized pellets.

A further embodiment of my invention will be seen with reference to the following example which illustrates the usefulness of my process for the treatment of steel mill waste products.

EXAMPLE III

Slag scrap was processed in a manner similar to that described in Example I. The feed material was pretreated before processing by upgrading it in means 6 to increase the iron content thereof while decreasing the percentage of $SiO_2$ and other undesirable components. The iron content was raised to about 62% before processing was begun. The particles were wetted in the wetting drum to a moisture content of about 2% and then mixed in the pelletizer with hot returns. The feed was subsequently subjected to an ignition temperature of about 1900° F. for about five minutes. The low ignition temperature and relatively long ignition period was sufficient to begin an exothermic reaction. A large portion of the heat for fusion was thus obtained from the oxidation of the metallic and ferrous iron content of the slag. Generally, in order for this exothermic heat to be sufficient, the total iron content of the processed material should be at least about 50%.

The sintered material was passed from sinter strand 42 to sizing roll crusher 64 which was adjusted to form primarily plus two inch particles. The minus two inch material was further crushed and recycled to the processing equipment without cooling. The product particles were cooled and analyzed, and found to have a total iron content of about 72%. The product proved to be excellent feed for steel making processes.

The above invention has been described with reference to certain embodiments thereof. It will be obvious to those skilled in the art who read this specification that other variations and modifications of the invention can be made and various equivalents substituted therein without departing from the principles disclosed or going outside the scope of the specification or purview of the claims.

Having thus described the invention, I claim:

1. Apparatus for the reclamation of waste particulate material comprising a pelletizer; means for feeding fine particulate material to said pelletizer; a sinter strand; means for feeding pellets from said pelletizer to said sinter strand; means for igniting said pellets on said sinter strand whereby said pellets become sintered; means for crushing said sintered pellets; means for screening said crushed pellets; said means for screening said crushed pellets dividing said crushed pellets into three portions, a fine portion, an intermediate portion and a coarse portion; means for recycling said fine portion to said pelletizing drum for preheating said fine particulate material and said pellets; means for recycling said intermediate portion to said sinter strand; means for removing said coarse portion as product; and means for cooling said coarse portion associated with said means for removing said coarse portion; said means for feeding pellets to said sinter strand including a conveyor belt which is longitudinally divided into two sections, a first section and a second section, said conveyor belt being disposed in a position normal to the direction of travel of said sinter strand, said first section of said conveyor belt being adapted to carry thereon a hearth layer and being upstream, with regard to said sinter strand, of said second section, and said second section of said conveyor belt being adapted to carry said pellets thereon, the head end of said conveyor belt being adapted to be reciprocated across the width of said sinter strand and then retracted whereby said hearth layer and said pellets are simultaneously, uniformly deposited on said sinter strand with said pellets forming a layer on top of said hearth layer.

2. The apparatus of claim 1 wherein said means for recycling said fine portion to said pelletizing drum is a heat resistant silicone impregnated wire belt.

3. The apparatus of claim 1 wherein said means for recycling said intermediate portion to said sinter strand is a heat resistant silicone impregnated wire belt.

4. Apparatus for the reclamation of waste particulate material comprising a pelletizer; means for feeding fine particulate material to said pelletizer; a sinter strand having a feed end, an ignition zone, and a discharge end; means for feeding pellets from said pelletizer to the feed end of said sinter strand; means for igniting said pellets on said sinter strand whereby said pellets become sintered; means for crushing said sintered pellets; means for screening said crushed pellets; said means for screening said crushed pellets dividing said crushed pellets into three portions, a fine portion, an intermediate portion and a coarse portion; means for recycling said fine portion to said pelletizing drum for preheating said fine particulate material and said pellets; means for recycling said intermediate portion to said sinter strand; means for removing said coarse portion as product; hood means operatively associated with and enclosing (a) the discharge end of the sinter strand, (b) said means for removing said coarse portion and (c) said crushing means; means for cooling said coarse portion and to maintain a dust free atmosphere by forcing air upwardly through said means for removing said coarse portion to cool said sinter and through said hood means to remove dust from the discharge end of the sinter strand; and means for delivering said air in heated condition to said means for feeding pellets to said sinter strand and to said means for ignition.

5. The apparatus of claim 4 wherein said means for feeding pellets to said sinter strand includes a conveyor belt which is longitudinally divided into two sections, a first section and a second section, said conveyor belt being disposed in a position normal to the direction of travel of said sinter strand, said first section of said conveyor belt being adapted to carry thereon hearth layer and said second section of said conveyor belt being adapted to carry said pellets thereon, the head end of said conveyor belt being adapted to be reciprocated across the width of said sinter strand and then retracted whereby said hearth layer and said pellets are uniformly deposited on said sinter strand.

6. Apparatus for the reclamation of waste particulate material comprising, in combination, a wetting drum; means to feed water to said wetting drum; means to automatically regulate the amount of water fed to said wetting drum relative to the amount of waste material fed thereto; a pelletizer receiving wet material from said wetting drum and forming pellets from the wet material; a sinter strand; means for feeding pellets from said pelletizer to said sinter strand; means for heating said pellets while on said sinter strand to a temperature between about 1850 and 2800° F. to form heated material; means for drawing air through said sinter strand; means for cleaning said air with scrubbing water; means for passing said scrubbing water to said means to feed water to said wetting drum; crushing means for said heated material; screening means to separate the crushed material into a plurality of portions; cooling means for one portion of said crushed material; and means for recycling another portion of said material to said pelletizer.

7. Apparatus for the reclamation of waste particulate material comprising, in combination, means to adjust the moisture content of said particulate material; a pelletizer forming pellets from the wet material; a sinter strand; means for feeding pellets from said pelletizer to said sinter strand; means for heating said pellets while on said sinter strand to a temperature between about 1850 and 2800° F. to form heated material; means for drawing air through said sinter strand; crushing means for said heated material; screening means to remove hot crushed fines from the crushed material; cooling means for another portion of said crushed material; and means for preheating the wet particulate material and the pellets in said pelletizer comprising means for recycling the hot crushed fines to said pelletizer.

8. The apparatus of claim 7 and further including a magnetic separator for the waste particulate material.

References Cited

UNITED STATES PATENTS

| | | | |
|---|---|---|---|
| 2,750,273 | 6/1956 | Lellep | 75—3 |
| 2,799,573 | 7/1957 | Barnett et al. | 75—3 |
| 2,876,489 | 3/1959 | McDowell et al. | 266—21 X |
| 3,003,864 | 10/1961 | Kraner et al. | 75—5 |
| 3,245,778 | 4/1966 | Ban | 75—5 |

J. SPENCER OVERHOLSER, *Primary Examiner.*

R. S. ANNEAR, *Assistant Examiner.*